(12) United States Patent
Och

(10) Patent No.: US 8,977,536 B2
(45) Date of Patent: Mar. 10, 2015

(54) METHOD AND SYSTEM FOR TRANSLATING INFORMATION WITH A HIGHER PROBABILITY OF A CORRECT TRANSLATION

(75) Inventor: Franz Josef Och, Mountain View, CA (US)

(73) Assignee: University of Southern California, Los Angeles, CA (US)

( * ) Notice: Subject to any disclaimer, the term of this patent is extended or adjusted under 35 U.S.C. 154(b) by 1303 days.

(21) Appl. No.: 12/132,401

(22) Filed: Jun. 3, 2008

(65) Prior Publication Data

US 2008/0270109 A1    Oct. 30, 2008

Related U.S. Application Data

(62) Division of application No. 11/107,304, filed on Apr. 15, 2005, now Pat. No. 8,666,725.

(60) Provisional application No. 60/562,774, filed on Apr. 16, 2004.

(51) Int. Cl.
*G06F 17/28* (2006.01)

(52) U.S. Cl.
CPC .................... *G06F 17/2818* (2013.01)
USPC ............... 704/4; 704/2; 704/3; 704/5; 704/7; 715/256

(58) Field of Classification Search
CPC . G06F 17/28; G06F 17/2809; G06F 17/2818; G06F 17/289; G06F 17/2827; G06F 17/2836
USPC ................. 704/2, 3, 4, 5, 9; 715/536
See application file for complete search history.

(56) References Cited

U.S. PATENT DOCUMENTS

| | | | |
|---|---|---|---|
| 4,502,128 | A | 2/1985 | Okajima et al. |
| 4,599,691 | A | 7/1986 | Sakaki et al. |
| 4,615,002 | A | 9/1986 | Innes |
| 4,661,924 | A | 4/1987 | Okamoto et al. |

(Continued)

FOREIGN PATENT DOCUMENTS

| | | |
|---|---|---|
| EP | 0469884 | 2/1992 |
| EP | 0715265 | 6/1996 |

(Continued)

OTHER PUBLICATIONS

Robert Frederking and Sergei Nirenburg. 1994. Three heads are better than one. In Proceedings of the 4th Conference on Applied Natural Language Processing, pp. 95-100, Stuttgart, Germany.*

(Continued)

*Primary Examiner* — Paras D Shah
(74) *Attorney, Agent, or Firm* — Carr & Ferrell LLP

(57) ABSTRACT

A system with a nonstatistical translation component integrated with a statistical translation component engine. The same corpus may be used for training the statistical engine and also for determining when to use the statistical engine and when to use the translation component. This training may use probabilistic techniques. Both the statistical engine and the translation components may be capable of translating the same information, however the system determines which component to use based on the training. Retraining can be carried out to add additional components, or when after additional translator training.

30 Claims, 3 Drawing Sheets

(56) References Cited

U.S. PATENT DOCUMENTS

| | | |
|---|---|---|
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,952,665 B1 | 10/2005 | Shimomura et al. |
| 6,983,239 B1 | 1/2006 | Epstein |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |

(56) References Cited

U.S. PATENT DOCUMENTS

| | | |
|---|---|---|
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,302,392 B1 | 11/2007 | Thenthiruperai et al. |
| 7,319,949 B2 | 1/2008 | Pinkham |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,830 B2 | 8/2009 | Al-Onaizan et al. |
| 7,587,307 B2 | 9/2009 | Cancedda et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 8,060,360 B2 | 11/2011 | He |
| 8,145,472 B2 | 3/2012 | Shore et al. |
| 8,214,196 B2 | 7/2012 | Yamada et al. |
| 8,244,519 B2 | 8/2012 | Bicici et al. |
| 8,265,923 B2 | 9/2012 | Chatterjee et al. |
| 8,326,598 B1 | 12/2012 | Macherey et al. |
| 8,886,515 B2 | 11/2014 | Van Assche |
| 8,886,517 B2 | 11/2014 | Soricut et al. |
| 8,886,518 B1 | 11/2014 | Wang et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0087313 A1 | 7/2002 | Lee et al. |
| 2002/0099744 A1 | 7/2002 | Coden et al. |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1* | 12/2002 | Marcu ............................... 704/5 |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 | 4/2004 | Scanlan |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1* | 12/2004 | Richardson et al. ............... 704/2 |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1* | 2/2005 | Koehn ............................... 704/2 |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0167984 A1 | 7/2006 | Fellenstein et al. |

(56) References Cited

U.S. PATENT DOCUMENTS

| | | | |
|---|---|---|---|
| 2006/0190241 A1 | 8/2006 | Goutte et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0043553 A1 | 2/2007 | Dolan |
| 2007/0050182 A1 | 3/2007 | Sneddon et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0052061 A1 | 2/2008 | Kim et al. |
| 2008/0065478 A1 | 3/2008 | Kohlmeier et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270112 A1 | 10/2008 | Shimohata |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0119091 A1 | 5/2009 | Sarig |
| 2009/0125497 A1 | 5/2009 | Jiang et al. |
| 2009/0234634 A1 | 9/2009 | Chen et al. |
| 2009/0241115 A1 | 9/2009 | Raffo et al. |
| 2009/0326912 A1 | 12/2009 | Ueffing |
| 2010/0017293 A1 | 1/2010 | Lung et al. |
| 2010/0042398 A1 | 2/2010 | Marcu et al. |
| 2010/0138213 A1 | 6/2010 | Bicici et al. |
| 2010/0174524 A1 | 7/2010 | Koehn |
| 2011/0029300 A1 | 2/2011 | Marcu et al. |
| 2011/0066643 A1 | 3/2011 | Cooper et al. |
| 2011/0082684 A1 | 4/2011 | Soricut et al. |
| 2012/0323554 A1 | 12/2012 | Hopkins et al. |

FOREIGN PATENT DOCUMENTS

| | | |
|---|---|---|
| EP | 0933712 A2 | 8/1999 |
| EP | 0933712 A3 | 1/2001 |
| JP | 07244666 | 9/1995 |
| JP | 10011447 | 1/1998 |
| JP | 11272672 | 10/1999 |
| WO | WO03083709 | 10/2003 |

OTHER PUBLICATIONS

Och, Franz Josef and Hermann Ney. 2002. Discriminative training and maximum entropy models for statistical machine translation. In Proc. of the 40th Annual Meeting of the Association for Computational Linguistics (ACL), Philadelphia, PA.*
Yasuda, K., Sugaya, F., Takezawa, T., Yamamoto, S. and Yanagida, M. 2002 Automatic Machine Translation Selection Scheme to Output the Best Result, Proc. of LREC.*
Koehn, Philipp, "Noun Phrase Translation," a Ph.D. dissertation for the University of Southern California, pp. xiii, 23, 25-47, 72-81, Dec. 2003.
Liu, Qun, "A Chinese-English Machine Translation System based on Micro-Engine Architecture," an International Conference on Translation and Information Technology, Hong Kong, Dec. 2000, pp. 1-10.
Ren, Fuji and Shi, Hongchi, "Parallel Machine Translation: Principles and Practice," Proceedings of Seventh IEEE International Conference on Engineering of Complex Computer Systems, 2001, pp. 249-259.
Uchimoto, K. et al., "Word Translation by Combining Example-Based Methods and Machine-Learning Models," Natural Language Processing (Shizen Gengo Shori), vol. 10, No. 3., Apr. 2003, pp. 87-114.
Uchimoto, K. et al., "Word Translation by Combining Example-Based Methods and Machine-Learning Models," Natural Language Processing (Shizen Gengo Shori), vol. 10, No. 3., Apr. 2003, pp. 87-114, (English translation).
Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.
"Patent Cooperation Treaty International Preliminary Report on Patentability and The Written Opinion, International application No. PCT/US2008/004296, Oct. 6, 2009, 5 pgs."
Document, Wikipedia.com, web.archive.org (Feb. 24, 2004) <http://web.archive.org/web/20040222202831 /http://en.wikipedia.org/wikiiDocument>.
Identifying, Dictionary.com, wayback.archive.org (Feb. 28, 2007) <http://wayback.archive.org/web/200501 01OOOOOO*/http:////dictionary.reference.com//browse//identifying>, <http://web.archive.org/web/20070228150533/http://dictionary.reference.com/browse/identifying>.
Elhadad, M. and Robin, J., "Controlling Content Realization with Functional Unification Grammars", 1992, Aspects of Automated Natural Language Generation, Dale et al. (eds)., Springer Verlag, pp. 89-104.
"Elhadad, Michael, ""FUF: the Universal Unifier User Manual Version 5.2"", 1993, Department of Computer Science,Ben Gurion University, Beer Sheva, Israel."
"Elhadad, Michael, ""Using Argumentation to Control Lexical Choice: A Functional Unification Implementation"",1992, Ph.D. Thesis, Graduate School of Arts and Sciences, Columbia University."
"Elhadad. M., and Robin, J., ""SURGE: a Comprehensive Plug-in Syntactic Realization Component for Text Generation"", 1999 (available at http://www.cs.bgu.ac.il/-elhadad/pub.html)."
Fleming, Michael et al., "Mixed-Initiative Translation of Web Pages," AMTA 2000, LNAI 1934, Springer-Verlag, Berlin, Germany, 2000, pp. 25-29.
Franz Josef Och, Hermann Ney: "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract.
Fung et al, "Mining Very-non parallel corpora: Parallel sentence and lexicon extractioin via bootstrapping and EM", In EMNLP 2004.
"Fung, P. and Yee, L., ""An IR Approach for Translating New Words from Nonparallel, Comparable Texts"", 1998,36th Annual Meeting of the ACL, 17th International Conference on Computational Linguistics, pp. 414-420."
"Fung, Pascale, ""Compiling Bilingual Lexicon Entries From a Non-Parallel English-Chinese Corpus"", 1995, Proc. of the Third Workshop on Very Large Corpora, Boston, MA, pp. 173-183."
"Gale, W. and Church, K., ""A Program for Aligning Sentences in Bilingual Corpora,"" 1991, 29th Annual Meeting of the ACL, pp. 177-183."
Gale, W. and Church, K., "A Program for Aligning Sentences in Bilingual Corpora," 1993, Computational . Linguisitcs, vol. 19, No. 1, pp. 177-184.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL Jul. 2004.

(56) References Cited

OTHER PUBLICATIONS

"Germann et al., ""Fast Decoding and Optimal Decoding for Machine Translation""", 2001, Proc. of the 39th Annual Meeting of the ACL, Toulouse, France, pp. 228-235."

"Germann, Ulrich: ""Building a Statistical Machine Translation System from Scratch: How Much Bang for theBuck Can We Expect?""" Proc. of the Data-Driven MT Workshop of ACL-01, Toulouse, France, 2001."

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.

"Grefenstette, Gregory, ""The World Wide Web as a Resource for Example-Based Machine Translation Tasks""", 1999, Translating and the Computer 21, Proc. of the 21 st International Cant. on Translating and the Computer. London, UK, 12 pp."

Grossi et al, "Suffix Trees and their applications in string algorithms", In. Proceedings of the 1st South American Workshop on String Processing, Sep. 1993, pp. 57-76.

Gupta et al., "Kelips: Building an Efficient and Stable P2P DHT thorough Increased Memory and Background Overhead," 2003 IPTPS, LNCS 2735, pp. 160-169.

Habash, Nizar, "The Use of a Structural N-gram Language Model in Generation-Heavy Hybrid Machine Translation," University of Maryland, Univ. Institute for Advance Computer Studies, Sep. 8, 2004.

"Hatzivassiloglou, V. et al., ""Unification-Based Glossing""",. 1995, Proc. of the International Joint Conference on Artificial Intelligence, pp. 1382-1389."

Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.

Ide, N. and Veronis, J., "Introduction to the Special Issue on Word Sense Disambiguation: The State of the Art", Mar. 1998, Computational Linguistics, vol. 24, Issue 1, pp. 2-40.

Ikel, D., Schwartz, R., and Weischedei, R., "An Algorithm that learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Imamura, Kenji, "Hierarchical Phrase Alignment Harmonized with Parsing", 2001, in Proc. of NLPRS, Tokyo.

"Jelinek, F., ""Fast Sequential Decoding Algorithm Using a Stack""", Nov. 1969, IBM J. Res. Develop., vol. 13, No. 6, pp. 675-685."

"Jones, K. Sparck, ""Experiments in Relevance Weighting of Search Terms""", 1979, Information Processing &Management, vol. 15, Pergamon Press Ltd., UK, pp. 133-144."

Klein et al., "Accurate Unlexicalized Parsing," Jul. 2003, in Proc. of the 41st Annual Meeting of the ACL, pp. 423-430.

"Knight et al., ""Integrating Knowledge Bases and Statistics in MT,""" 1994, Proc. of the Conference of the Association for Machine Translation in the Americas."

"Knight et al., ""Filling Knowledge Gaps in a Broad-Coverage Machine Translation System""", 1995, Proc. ofthe14th International Joint Conference on Artificial Intelligence, Montreal, Canada, vol. 2, pp. 1390-1396."

"Knight, K. and Al-Onaizan, Y., ""A Primer on Finite-State Software for Natural Language Processing""", 1999 (available at http://www.isI.edu/licensed-sw/carmel)."

Knight, K. and Al-Onaizan, Y., "Translation with Finite-State Devices," Proceedings of the 4th AMTA Conference, 1998.

"Knight, K. and Chander, I., ""Automated Postediting of Documents,""" 1994, Proc. of the 12th Conference on Artificial Intelligence, pp. 779-784."

Knight, K. and Graehl, J., "Machine Transliteration", 1997, Proc. of the ACL-97, Madrid, Spain, pp. 128-135.

"Knight, K. and Hatzivassiloglou, V., ""Two-Level, Many-Paths Generation,""" D 1995, Proc. of the 33rd Annual Conference of the ACL, pp. 252-260."

"Knight, K. and Luk, S., ""Building a Large-Scale Knowledge Base for Machine Translation,""" 1994, Proc. of the 12th Conference on Artificial Intelligence, pp. 773-778."

"Knight, K. and Marcu, D., ""Statistics-Based Summarization—Step One: Sentence Compression,""" 2000, American Association for Artificial Intelligence Conference, pp. 703-710."

"Knight, K. and Yamada, K., ""A Computational Approach to Deciphering Unknown Scripts,""" 1999, Proc. of the ACL Workshop on Unsupervised Learning in Natural Language Processing."

"Knight, Kevin, ""A Statistical MT Tutorial Workbook,""" 1999, JHU Summer Workshop (available at http://www.isI.edu/natural-language/mUwkbk.rtf)."

Knight, Kevin, "Automating Knowledge Acquisition for Machine Translation," 1997, AI Magazine 18(4).

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics,25(4).

Knight, Kevin, ""Integrating Knowledge Acquisition and Language Acquisition""", May 1992, Journal of Applied Intelligence, vol. 1, No. 4.

Knight, Kevin, "Learning Word Meanings by Instruction," 1996, Proc. of the D National Conference on Artificial Intelligence, vol. 1, pp. 447-454.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Knowledge Sources for Word-Level Translation Models," 2001, Conference on Empirical Methods in Natural Language Processing.

Koehn, P., et al, "Statistical Phrase-Based Translation," Proceedings of HLT-NAACL 2003 Main Papers, pp. 48-54 Edmonton, May-Jun. 2003.

Abney, S.P., "Stochastic Attribute Value Grammars", Association for Computional Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation" <URL: http://acl.ldc.upenn.edu/J/J03/J03-1005.pdf>, 2003.

Wang, W., et al. "Capitalizing Machine Translation" In HLT-NAACL '06 Proceedings Jun. 2006. <http://www.isi.edu/natural-language/mt/hlt-naacl-06-wang.pdf>.

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.

"Abney, Steven P. , ""Parsing by Chunks,""" 1991, Principle-Based Parsing: Computation and Psycholinguistics, vol. 44,pp. 257-279."

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

"Al-Onaizan et al., ""Translating with Scarce Resources,""" 2000, 17th National Conference of the American Associationfor Artificial Intelligence, Austin, TX, pp. 672-678."

Al-Onaizan, Y. and Knight K., "Machine Transliteration of Names in Arabic Text," Proceedings of ACL Workshop on Computational Approaches to Semitic Languages. Philadelphia, 2002.

"Al-Onaizan, Y. and Knight, K., ""Named Entity Translation: Extended Abstract""", 2002, Proceedings of HLT-02, SanDiego, CA."

"Al-Onaizan, Y. and Knight, K., ""Translating Named Entities Using Monolingual and Bilingual Resources,""" 2002, Proc. of the 40th Annual Meeting of the ACL, pp. 400-408."

(56) References Cited

OTHER PUBLICATIONS

"Alshawi et al., ""Learning Dependency Translation Models as Collections of Finite-State Head Transducers,"" 2000, Computational Linguistics, vol. 26, pp. 45-60."

Alshawi, Hiyan, "Head Automata for Speech Translation", Proceedings of the ICSLP 96, 1996, Philadelphia, Pennslyvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

"Arbabi et al., ""Algorithms for Arabic name transliteration,"" Mar. 1994, IBM Journal of Research and Development,vol. 38, Issue 2, pp. 183-194."

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information," SIGIR 97, Philadelphia, PA, © 1997, pp. 84-91.

"Bangalore, S. and Rambow, 0., ""Evaluation Metrics for Generation,"" 2000, Proc. of the 1st International NaturalLanguage Generation Conf., vol. 14, pp. 1-8."

"Bangalore, S. and Rambow, 0., ""Using TAGs, a Tree Model, and a Language Model for Generation,"" May 2000,Workshop TAG+5, Paris."

"Bangalore, S. and Rambow, O., ""Corpus-Based Lexical Choice in Natural Language Generation,"" 2000, Proc. of the 38th Annual ACL, Hong Kong, pp. 464-471."

"Bangalore, S. and Rambow, O., ""Exploiting a Probabilistic Hierarchical Model for Generation,"" 2000, Proc. of 18thconf. on Computational Linguistics, vol. 1, pp. 42-48."

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

"Barnett et al., ""Knowledge and Natural Language Processing,"" Aug. 1990, Communications of the ACM, vol. 33,Issue 8, pp. 50-71."

"Baum, Leonard, ""An Inequality and Associated Maximization Technique in Statistical Estimation for Probabilistic Functions of Markov Processes"", 1972, Inequalities 3:1-8."

Berhe, G. et al., "Modeling Service-baed Multimedia Content Adaptation in Pervasive Computing," CF '04 (Ischia, Italy) Apr. 14-16, 2004, pp. 60-69.

"Bikel et al., ""An Algorithm that Learns What's in a Name,"" 1999, Machine Learning Journal Special Issue on Natural Language Learning, vol. 34, pp. 211-232."

Boitet, C. et al., "Main Research Issues in Building Web Services," Proc. of the 6th Symposium on Natural Language Processing, Human and Computer Processing of Language and Speech, © 2005, pp. 1-11.

"Brants, Thorsten, ""TnT—A Statistical Part-of-Speech Tagger,"" 2000, Proc. of the 6th Applied Natural Language Processing Conference, Seattle."

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

"Brill, Eric. ""Transformation-Based Error-Driven Learning and Natural Language Processing: A Case Study in Part of Speech Tagging"""",1995, Computational Linguistics, vol. 21, No. 4, pp. 543-565."

"Brown et al., ""A Statistical Approach to Machine Translation,"" Jun. 1990, Computational Linguistics, vol. 16, No. 2, pp. 79-85."

Brown et al., "Word-Sense Disambiguation Using Statistical Methods," 1991, Proc. of 29th Annual ACL, pp. 264-270.

"Brown et al., ""The Mathematics of Statistical Machine Translation: Parameter D Estimation,"" 1993, Computational Linguistics, vol. 19, Issue 2, pp. 263-311."

"Brown, Ralf, ""Automated Dictionary Extraction for ""Knowledge-Free"" Example-Based Translation,"" 1997, Proc. of 7th Int'l Cont. on Theoretical and Methodological Issues in MT, Santa Fe, NM, pp. 111-118."

"Callan et al., ""TREC and TIPSTER Experiments with Inquery,"" 1994, Information Processing and Management, vol. 31, Issue 3, pp. 327-343."

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004) Annual Meeting of the ACL. Assoc. for Computational Linguistics, Morristown, NJ, 1.

"Carl, Michael. ""A Constructivist Approach to Machine Translation,"" 1998, New Methods of Language Processing and Computational Natural Language Learning, pp. 247-256."

"Chen, K. and Chen, H., ""Machine Translation: An Integrated Approach,"" 1995, Proc. of 6th Int'l Cont. on Theoretical and Methodological Issue in MT, pp. 287-294."

Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Chinchor, Nancy, "MUC-7 Named Entity Task Definition," 1997, Version 3.5.

"Clarkson, P. and Rosenfeld, R., ""Statistical Language Modeling Using the CMU-Cambridge Toolkit"", 1997, Proc. ESCA Eurospeech, Rhodes, Greece, pp. 2707-2710."

Cohen et al., "Spectral Bloom Filters," SIGMOD 2003, Jun. 9-12, 2003, ACM pp. 241-252.

Cohen, "Hardware-Assisted Algorithm for Full-text Large-dictionary String Matching Using n-gram Hashing," 1998, Information Processing and Management, vol. 34, No. 4, pp. 443-464.

Cohen, Yossi, "Interpreter for FUF," (available at ftp:/lftp.cs.bgu.acil/pUb/people/elhadad/fuf-life.lf), 2008.

"Corston-Oliver, Simon, ""Beyond String Matching and Cue Phrases: Improving Efficiency and Coverage in Discourse Analysis"", 1998, The AAAI Spring Symposium on Intelligent Text Summarization, pp. 9-15."

Covington, "An Algorithm to Align Words for Historical Comparison", Computational Linguistics, 1996, 22(4), pp. 481-496.

"Dagan, I. and Itai, A., ""Word Sense Disambiguation Using a Second Language Monolingual Corpus"", 1994, Association for Computational Linguistics, vol. 20, No. 4, pp. 563-596."

"Dempster et al., ""Maximum Likelihood from Incomplete Data via the EM Algorithm"", 1977, Journal of the Royal Statistical Society, vol. 39, No. 1, pp. 1-38."

"Diab, M. and Finch, S., ""a Statistical Word-Level Translation Model for Comparable Corpora,"" 2000, In Proc. of the Conference on Content Based Multimedia Information Access (RIAO)."

"Diab, Mona, ""An Unsupervised Method for Multilingual Word Sense Tagging Using Parallel Corpora: A Preliminary Investigation"", 2000, SIGLEX Workshop on Word Senses and Multi-Linguality, pp. 1-9."

Eisner, Jason,"Learning Non-Isomorphic Tree Mappings for Machine Translation," 2003, in Proc. of the 41st Meeting of the ACL, pp. 205-208.

Elhadad et al., "Floating Constraints in Lexical Choice", 1996, ACL, 23(2): 195-239.

"Elhadad, M. and Robin, J., ""An Overview of SURGE: a Reusable Comprehensive Syntactic Realization Component,"" 1996, Technical Report 96-03, Department of Mathematics and Computer Science, Ben Gurion University, Beer Sheva, Israel."

"Koehn, P. and Knight, K., ""Estimating Word Translation Probabilities from Unrelated Monolingual Corpora Using the EM Algorithm,"" 2000, Proc. of the 17th meeting of the AAAI."

"Kumar, R. and Li, H., ""Integer Programming Approach to Printed Circuit Board Assembly Time Optimization,"" 1995,IEEE Transactions on Components, Packaging, and Manufacturing, Part B: Advance Packaging, vol. 18,No. 4. pp. 720-727."

(56) References Cited

OTHER PUBLICATIONS

Kupiec, Julian, "An Algorithm for Finding Noun Phrase Correspondecnes in Bilingual Corpora," In Proceedings of the 31st Annual Meeting of the ACL, 1993, pp. 17-22.
"Kurohashi, S. and Nagao, M., ""Automatic Detection of Discourse Structure by Checking Surface Information in Sentences,"" 1994, Proc. of COL-LING '94, vol. 2, pp. 1123-1127."
"Langkilde, I. and Knight, K., ""Generation that Exploits Corpus-Based Statistical Knowledge,"" 1998, Proc. of the COLING-ACL, pp. 704-710."
"Langkilde, I. and Knight, K., ""The Practical Value of N-Grams in Generation,"" 1998, Proc. of the 9th International Natural Language Generation Workshop, pp. 248-255."
"Langkilde, Irene, ""Forest-Based Statistical Sentence Generation,"" 2000, Proc. of the 1st Conference on North American chapter of the ACL, Seattle, WA, pp. 170-177."
"Langkilde-Geary, Irene, ""A Foundation for General-Purpose Natural Language Generation: Sentence Realization Using Probabilistic Models of Language,"" 2002, Ph.D. Thesis, Faculty of the Graduate School, University of Southern California."
"Langkilde-Geary, Irene, ""An Empirical Verification of Coverage and Correctness for a General-Purpose Sentence Generator,"" 1998, Proc. 2nd Int'l Natural Language Generation Conference."
"Lee-Y.S., ""Neural Network Approach to Adaptive Learning: with an Application to Chinese Homophone Disambiguation,"" IEEE pp. 1521-1526."", 2003.
Lita, L., et al., "tRuEcasing," Proceedings of the 41st Annual Meeting of the Assoc. for Computational Linguistics (In Hinrichs, E. and Roth, D.—editors), pp. 152-159, 2003.
Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.
"Mann, G. and Yarowsky, D., ""Multipath Translation Lexicon Induction via Bridge Languages,"" 2001, Proc. of the 2nd Conference of the North American Chapter of the ACL, Pittsburgh, PA, pp. 151-158."
"Manning, C. and Schutze, H., ""Foundations of Statistical Natural Language Processing,"" 2000, The MIT Press, Cambridge, MA [redacted]."
"Marcu, D. and Wong, W., ""A Phrase-Based, Joint Probability Model for Statistical Machine Translation,"" 2002, Proc. of ACL-2 conference on Empirical Methods in Natural Language Processing, vol. 10, pp. 133-139."
"Marcu, Daniel, ""Building Up Rhetorical Structure Trees,"" 1996, Proc. of the National Conference on Artificial Intelligence and Innovative Applications of Artificial Intelligence Conference, vol. 2, pp. 1069-1074."
"Marcu, Daniel, ""Discourse trees are good indicators of importance in text,"" 1999, Advances in Automatic Text Summarization, The MIT Press, Cambridge, MA."
"Marcu, Daniel, ""Instructions for Manually Annotating the Discourse Structures of Texts,"" 1999, Discourse Annotation, pp. 1-49."
"Marcu, Daniel, ""The Rhetorical Parsing of Natural Language Texts,"" 1997, Proceedings of Aclieacl '97, pp. 96-103."
"Marcu, Daniel, ""The Rhetorical Parsing, Summarization, and Generation of Natural Language Texts,"" 1997, Ph. D. Thesis, Graduate Department of Computer Science, University of Toronto."
"Marcu, Daniel, ""Towards a Unified Approach to Memory- and Statistical-Based Machine Translation,"" 2001, Proc. of the 39th Annual Meeting of the ACL, pp. 378-385."
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.
McDevitt, K. et al., "Designing of a Community-based Translation Center," Technical Report TR-03-30, Computer Science, Virginia Tech, © 2003, pp. 1-8.
"Melamed, I. Dan, ""A Word-to-Word Model of Translational Equivalence,"" 1997, Proc. of the 35th Annual Meeting of the ACL, Madrid, Spain, pp. 490-497."
"Melamed, I. Dan, ""Automatic Evaluation and Uniform Filter Cascades for Inducing N-Best Translation Lexicons,""1995, Proc. of the 3rd Workshop on Very Large Corpora, Boston, MA, pp. 184-198."
"Melamed, I. Dan, ""Empirical Methods for Exploiting Parallel Texts,"" 2001, MIT Press, Cambridge, MA [table of contents]."
"Meng et al.. ""Generating Phonetic Cognates to Handle Named Entities in English-Chinese Cross-LanguageSpoken Document Retrieval,"" 2001, IEEE Workshop on Automatic Speech Recognition and Understanding. pp. 311-314."
Metze, F. et al., "The NESPOLE! Speech-to-Speech Translation System," Proc. of the HLT 2002, 2nd Int'l Conf. on Human Language Technology (San Francisco, CA), © 2002, pp. 378-383.
"Mikheev et al., ""Named Entity Recognition without Gazeteers,"" 1999, Proc. of European Chapter of the ACL, Bergen, Norway, pp. 1-8."
"Miike et al., ""A full-text retrieval system with a dynamic abstract generation function,"" 1994, Proceedings of SI-GIR'94, pp. 152-161."
"Mohri, M. and Riley, M., ""An Efficient Algorithm for the N-Best-Strings Problem,"" 2002, Proc. of the 7th Int. Conf. on Spoken Language Processing (ICSLP'02), Denver, CO, pp. 1313-1316."
Mohri, Mehryar, "Regular Approximation of Context Free Grammars Through Transformation", 2000, pp. 251-261, "Robustness in Language and Speech Technology", Chapter 9, Kluwer Academic Publishers.
"Monasson et al., ""Determining computational complexity from characteristic 'phase transitions',"" Jul. 1999, Nature Magazine, vol. 400, pp. 133-137."
"Mooney, Raymond, ""Comparative Experiments on Disambiguating Word Senses: An Illustration of the Role of Biasin Machine Learning,"" 1996, Proc. of the Conference on Empirical Methods in Natural Language Processing, pp. 82-91."
Nagao, K. et al., "Semantic Annotation and Transcoding: Making Web Content More Accessible," IEEE Multimedia, vol. 8, Issue 2 Apr.-Jun. 2001, pp. 69-81.
"Nederhof, M. and Satta, G., ""IDL-Expressions: A Formalism for Representing and Parsing Finite Languages in Natural Language Processing,"" 2004, Journal of Artificial Intelligence Research, vol. 21, pp. 281-287."
"Niessen,S. and Ney, H, ""Toward hierarchical models for statistical machine translation of inflected languages,"" 2001,Data-Driven Machine Translation Workshop, Toulouse, France, pp. 47-54."
Norvig, Peter, "Techniques for Automatic Memoization with Applications to Context-Free Parsing", Compuational Linguistics,1991, pp. 91-98, vol. 17, No. 1.
"Och et al., ""Improved Alignment Models for Statistical Machine Translation,"" 1999, Proc. of the Joint Conf. of Empirical Methods in Natural Language Processing and Very Large Corpora, pp. 20-28."
Och et al. "A Smorgasbord of Features for Statistical Machine Translation." HLTNAACL Conference. Mar. 2004, 8 pages.
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.
"Och, F. and Ney, H, ""Improved Statistical Alignment Models,"" 2000, 38th Annual Meeting of the ACL, Hong Kong, pp. 440-447."
Och, F. and Ney, H., "Discriminative Training and Maximum Entropy Models for Statistical Machine Translation," 2002, Proc. of the 40th Annual Meeting of the ACL, Philadelphia, PA, pp. 295-302.
Och, F. and Ney, H., "A Systematic Comparison of Various Statistical Alignment Models," Computational Linguistics, 2003, 29:1, 19-51.
"Papineni et al., ""Bleu: a Method for Automatic Evaluation of Machine Translation,"" 2001, IBM Research Report, RC22176(WQ102-022)."
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

(56) References Cited

OTHER PUBLICATIONS

Petrov et al., "Learning Accurate, Compact and Interpretable Tree Annotation," Jun. 4-9, 2006, in Proc. of the Human Language Technology Conference of the North American Chapter of the ACL, pp. 433-440.
"Pla et al., ""Tagging and Chunking with Bigrams,""" 2000, Proc. of the 18th Conference on Computational Linguistics vol. 2, pp. 614-620."
"Rapp, Reinhard, Automatic Identification of Word Translations from Unrelated English and German Corpora, 1999,37th Annual Meeting of the ACL, pp. 519-526."
"Rapp, Reinhard, ""Identifying Word Translations in Non-Parallel Texts,""" 1995, 33rd Annual Meeting of the ACL, pp. 320-322."
Rayner et al.,"Hybrid Language Processing in the Spoken Language Translator," IEEE, pp. 107-110, 1997.
"Resnik, P. and Smith, A., ""The Web as a Parallel Corpus,""" Sep. 2003, Computational Linguistics, Special Issue on Web as Corpus, vol. 29, Issue 3, pp. 349-380."
"Resnik, P. and Yarowsky, D. ""A Perspective on Word Sense Disambiguation Methods and Their Evaluation,"""1997, Proceedings of SIGLEX '97, Washington, D.C., pp. 79-86."
"Resnik, Philip, ""Mining the Web for Bilingual Text,""" 1999, 37th Annual Meeting of the ACL, College Park, MD, pp. 527-534."
Rich, E. and Knight, K., "Artificial Intelligence, Second Edition," 1991, McGraw-Hili Book Company [redacted].
"Richard et al., ""Visiting the Traveling Salesman Problem with Petri nets and application in the glass industry,""" Feb. 1996, IEEE Emerging Technologies and Factory Automation, pp. 238-242."
"Robin, Jacques, ""Revision-Based Generation of Natural Language Summaries Providing Historical Background: Corpus-Based Analysis, Design Implementation and Evaluation,""" 1994, Ph.D. Thesis, Columbia University, New York."
Rogati et al., "Resource Selection for Domain-Specific Cross-Lingual IR," ACM 2004, pp. 154-161.
Ruiqiang, Z. et al., "The NiCT-ATR Statistical Machine Translation System for the IWSLT 2006 Evaluation," submitted to IWSLT, 2006.
"Russell, S. and Norvig, P., ""Artificial Intelligence: A Modern Approach,""" 1995, Prentice-Hall, Inc., New Jersey [redacted—table of contents]."
"Sang, E. and Buchholz, S., ""Introduction to the CoNLL-2000 Shared Task: Chunking,""" 20002, Proc. ofCoNLL-2000 and LLL-2000, Lisbon, Portugal, pp. 127-132."
Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
"Schutze, Hinrich, ""Automatic Word Sense Discrimination,""" 1998, Computational Linguistics, Special Issue on Word Sense Disambiguation, vol. 24, Issue 1, pp. 97-123."
"Selman et al., ""A New Method for Solving Hard Satisfiability Problems,""" 1992, Proc. of the 10th National Conference on Artificial Intelligence, San Jose, CA, pp. 440-446."
Kumar, S. and Byrne, W., "Minimum Bayes-Risk Decoding for Statistical Machine Translation." HLTNAACL Conference. Mar. 2004, 8 pages.
"Shapiro, Stuart (ed.), ""Encyclopedia of Artificial Intelligence, 2nd edition""", vol. D 2,1992, John Wiley & Sons Inc;""Unification"""" article, K. Knight, pp. 1630-1637."
Shirai, S., "A Hybrid Rule and Example-based Method for Machine Translation," NTT Communication Science Laboratories, pp. 1-5, 1997.
"Sobashima et al., ""A Bidirectional Transfer-Driven Machine Translation System for Spoken Dialogues,""" 1994, Proc. of 15th Conference on Computational Linguistics, vol. 1, pp. 64-68."
"Soricut et al., ""Using a large monolingual corpus to improve translation accuracy,""" 2002, Lecture Notes in Computer Science, vol. 2499, Proc. of the 5th Conference of the Association for Machine Translation in theAmericas on Machine Translation: From Research to Real Users, pp. 155-164."

"Sumita et al., ""A Discourse Structure Analyzer for Japanese Text,""" 1992, Proc. of the International Conference on Fifth Generation Computer Systems, vol. 2, pp. 1133-1140."
"Sun et al., ""Chinese Named Entity Identification Using Class-based Language Model,""" 2002, Proc. of 19th International Conference on Computational Linguistics, Taipei, Taiwan, vol. 1, pp. 1-7."
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.
"Taylor et al., ""The Penn Treebank: An Overview,""" in A. Abeill (ed.), D Treebanks: Building and Using Parsed Corpora, 2003, pp. 5-22."
"Tiedemann, Jorg, ""Automatic Construction of Weighted String Similarity Measures,""" 1999, In Proceedings ofthe Joint SIGDAT Conference on Emperical Methods in Natural Language Processing and Very Large Corpora."
"Tillman, C. and Xia, F., ""A Phrase-Based Unigram Model for Statistical Machine Translation,""" 2003, Proc. of the North American Chapter of the ACL on Human Language Technology, vol. 2, pp. 106-108."
"Tillmann et al., ""A DP based Search Using Monotone Alignments in Statistical Translation,""" 1997, Proc. of the Annual Meeting of the ACL, pp. 366-372."
Tomas, J., "Binary Feature Classification for Word Disambiguation in Statistical Machine Translation," Proceedings of the 2nd Int'l. Workshop on Pattern Recognition, 2002, pp. 1-12.
Stalls, B. and Knight, K., "Translating Names and Technical Terms in Arabic Text," 1998, Proc. of the COLING/ACL Workkshop on Computational Approaches to Semitic Language.
"Ueffing et al., ""Generation of Word Graphs in Statistical Machine Translation,""" 2002, Proc. of Empirical Methods in Natural Language Processing (EMNLP), pp. 156-163."
Varga et al, "Parallel corpora for medium density languages", In Proceedings of RANLP 2005, pp. 590-596.
"Veale, T. and Way, A., ""Gaijin: A Bootstrapping, Template-Driven Approach to Example-Based MT,""" 1997, Proc. of New Methods in Natural Language Processing (NEMPLP97), Sofia, Bulgaria."
Vogel et al., "The CMU Statistical Machine Translation System," 2003, Machine Translation Summit IX, New Orleans, LA.
"Vogel et al., ""The Statistical Translation Module in the Verbmobil System,""" 2000, Workshop on Multi-Lingual Speech Communication, pp. 69-74."
"Vogel, S. and Ney, H., ""Construction of a Hierarchical Translation Memory,""" 2000, Proc. of Cooling 2000, Saarbrucken, Germany, pp. 1131-1135."
"Wang, Y. and Waibel, A., ""Decoding Algorithm in Statistical Machine Translation,""" 1996, Proc. of the 35th Annual Meeting of the ACL, pp. 366-372."
"Wang, Ye-Yi, ""Grammar Inference and Statistical Machine Translation,""" 1998, Ph.D Thesis, Carnegie Mellon University, Pittsburgh, PA."
"Watanabe et al., ""Statistical Machine Translation Based on Hierarchical Phrase Alignment,""" 2002, 9th International Conference on Theoretical and Methodological Issues in Machin Translation (TMI-2002), Keihanna, Japan, pp. 188-198."
"Witbrock, M. and Mittal, V., ""Ultra-Summarization: A Statistical Approach to Generating Highly Condensed Non-Extractive Summaries,""" 1999, Proc. of SIGIR '99, 22nd International Conference on Research and Development in Information Retrieval, Berkeley, CA, pp. 315-316."
"Wu, Dekai, ""A Polynomial-Time Algorithm for Statistical Machine Translation,""" 1996, Proc. of 34th Annual Meeting of the ACL, pp. 152-158."
"Wu, Dekai, ""Stochastic Inversion Transduction Grammars and Bilingual Parsing of Parallel Corpora,""" 1997, Computational Linguistics, vol. 23, Issue 3, pp. 377-403."

(56) References Cited

OTHER PUBLICATIONS

"Yamada, K. and Knight, K. ""A Syntax-based Statistical Translation Model,"" D 2001, Proc. of the 39th Annual Meeting of the ACL, pp. 523-530."

"Yamada, K. and Knight, K., ""A Decoder for Syntax-based Statistical MT,"" 2001, Proceedings of the 40th Annual Meeting of the ACL, pp. 303-310."

Yamada K., "A Syntax-Based Statistical Translation Model," 2002 PhD Dissertation, pp. 1-141.

"Yamamoto et al., ""A Comparative Study on Translation Units for Bilingual Lexicon Extraction,"" 2001, Japan Academic Association for Copyright Clearance, Tokyo, Japan."

Yamamoto et al, "Acquisition of Phrase-level Bilingual Correspondence using Dependency Structure" In Proceedings of COLING-2000, pp. 933-939.

"Yarowsky, David, ""Unsupervised Word Sense Disambiguation Rivaling Supervised Methods,"" 1995, 33rd Annual Meeting of the ACL, pp. 189-196."

Zhang et al., "Synchronous Binarization for Machine Translations," Jun. 4-9, 2006, in Proc. of the Human Language Technology Conference of the North American Chapter of the ACL, pp. 256-263.

Huang et al. Automatic Extraction of Named Entity Translingual Equivalence Based on Multi-Feature Cost Minimization. In Proceedings of the ACL 2003 Workshop on Multilingual and Mixed-Language Name Entry Recognition.

Bangalore, S. and Rambow, O., "Using TAGs, a Tree Model, and a Language Model for Generation," May 2000, Workshop TAG+5, Paris.

Gale, W. and Church, K., "A Program for Aligning Sentences in Bilingual Corpora," 1993, Computational Linguistics, vol. 19, No. 1, pp. 75-102.

Bangalore, S. and Rambow, O., ""Using TAGs, a Tree Model, and a Language Model for Generation,"" May 2000,Workshop TAG+5, Paris.

Ueffing et al., "Using POS Information for Statistical Machine Translation into Morphologically Rich Languages," In EACL, 2003: Proceedings of the Tenth Conference on European Chapter of the Association for Computational Linguistics, pp. 347-354.

Papineni et al., "Bleu: a Method for Automatic Evaluation of Machine Translation", Proc. of the 40th Annual Meeting of the Association for Computational Linguistics (ACL), Jul. 2002, pp. 311-318.

Shaalan et al., "Machine Translation of English Noun Phrases into Arabic", (2004), vol. 17, No. 2, International Journal of Computer Processing of Oriental Languages, 14 pages.

Isahara et al., "Analysis, Generation and Semantic Representation in Contrast—A Context-Based Machine Translation System", 1995, Systems and Computers in Japan, vol. 26, No. 14, pp. 37-53.

Proz.com, Rates for proofreading versus Translating, http://www.proz.com/forum/business_issues/202-rates_for_proofreading_versus_translating.html, Apr. 23, 2009, retrieved Jul. 13, 2012.

Celine, Volume discounts on large translation project, naked translations, http://www.nakedtranslations.com/en/2007/volume-discounts-on-large-translation-projects/, Aug. 1, 2007, retrieved Jul. 16, 2012.

Graehl, J and Knight, K, May 2004, Training Tree Transducers, In NAACL-HLT (2004), pp. 105-112.

Niessen et al, "Statistical machine translation with scarce resources using morphosyntactic information", Jun. 2004, Computational Linguistics, vol. 30, issue 2, pp. 181-204.

Liu et al., "Context Discovery Using Attenuated Bloom Filters in Ad-Hoc Networks," Springer, pp. 13-25, 2006.

First Office Action mailed Jun. 7, 2004 in Canadian Patent Application 2408819, filed May 11, 2001.

First Office Action mailed Jun. 14, 2007 in Canadian Patent Application 2475857, filed Mar. 11, 2003.

Office Action mailed Mar. 26, 2012 in German Patent Application 10392450.7, filed Mar. 28, 2003.

First Office Action mailed Nov. 5, 2008 in Canadian Patent Application 2408398, filed Mar. 27, 2003.

Second Office Action mailed Sep. 25, 2009 in Canadian Patent Application 2408398, filed Mar. 27, 2003.

First Office Action mailed Mar. 1, 2005 in European Patent Application No. 03716920.8, filed Mar. 27, 2003.

Second Office Action mailed Nov. 9, 2006 in European Patent Application No. 03716920.8, filed Mar. 27, 2003.

Third Office Action mailed Apr. 30, 2008 in European Patent Application No. 03716920.8, filed Mar. 27, 2003.

Office Action mailed Oct. 25, 2011 in Japanese Patent Application 2007-536911 filed Oct. 12, 2005.

Office Action mailed Jul. 24, 2012 in Japanese Patent Application 2007-536911 filed Oct. 12, 2005.

Final Office Action mailed Apr. 9, 2013 in Japanese Patent Application 2007-536911 filed Oct. 12, 2005.

Office Action mailed May 13, 2005 in Chinese Patent Application 1812317.1, filed May 11, 2001.

Office Action mailed Apr. 21, 2006 in Chinese Patent Application 1812317.1, filed May 11, 2001.

Office Action mailed Jul. 19, 2006 in Japanese Patent Application 2003-577155, filed Mar. 11, 2003.

Office Action mailed Mar. 1, 2007 in Chinese Patent Application 3805749.2, filed Mar. 11, 2003.

Office Action mailed Feb. 27, 2007 in Japanese Patent Application 2002-590018, filed May 13, 2002.

Office Action mailed Jan. 26, 2007 in Chinese Patent Application 3807018.9, filed Mar. 27, 2003.

Office Action mailed Dec. 7, 2005 in Indian Patent Application 2283/DELNP/2004, filed Mar. 11, 2003.

Office Action mailed Mar. 31, 2009 in European Patent Application 3714080.3, filed Mar. 11, 2003.

Agichtein et al., "Snowball: Extracting Information from Large Plain-Text Collections," ACM DL '00, the Fifth ACM Conference on Digital Libraries, Jun. 2, 2000, San Antonio, TX, USA.

Satake, Masaomi, "Anaphora Resolution for Named Entity Extraction in Japanese Newspaper Articles," Master's Thesis [online], Feb. 13, 2002, School of Information Science, JAIST, Nomi, Ishikaw, Japan.

Office Action mailed Aug. 29, 2006 in Japanese Patent Application 2003-581064, filed Mar. 27, 2003.

Office Action mailed Jan. 26, 2007 in Chinese Patent Application 3807027.8, filed Mar. 28, 2003.

Office Action mailed Jul. 25, 2006 in Japanese Patent Application 2003-581063, filed Mar. 28, 2003.

Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.

Melamed et al., "Statistical machine translation by generalized parsing," 2005, Technical Report 05-001, Proteus Project, New York University, http://nlp.cs.nyu.edu/pubs/.

Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.

Huang et al., "Statistical syntax-directed translation with extended domain of locality," Jun. 9, 2006, In Proceedings of AMTA, pp. 1-8.

\* cited by examiner

METHOD AND SYSTEM FOR TRANSLATING INFORMATION WITH A HIGHER PROBABILITY OF A CORRECT TRANSLATION

CROSS-REFERENCE TO RELATED APPLICATION

This application is a divisional and claims the priority of U.S. patent application Ser. No. 11/107,304, entitled "Selection and Use of Nonstatistical Translation Components in a Statistical Machine Translation Framework," filed on Apr. 15, 2005, now U.S. Pat. No. 8,666,725, which claims the benefit of U.S. Provisional Patent Application No. 60/562,774, filed on Apr. 16, 2004, the subject matter of which are hereby incorporated by reference.

FEDERALLY SPONSORED RESEARCH OR DEVELOPMENT

The U.S. Government may have certain rights in this invention pursuant to Grant No. N66001-00-1-8914 awarded by DARPA.

BACKGROUND

Statistical machine translation automatically learns how to translate using a training corpus. The learned information can then be used to translate another, "unknown" text, using information that the machine learned from the training operation.

However, current statistical machine translation models are typically not suited for certain types of expressions, e.g., those where statistical substitution is not possible or feasible. For example, the current state of statistical machine translation systems does not allow translating Chinese numbers into English until the numbers have been seen and the correct translation has been learned. Similar issues may exist for translations of names, dates, and other proper nouns.

In addition, it may be desirable to conform a machine translation output to certain formats. The most desirable format may be different than the training corpus, or inconsistent within the training corpus. As an example, Chinese names may be present in a training corpus with the family name first, followed by the surname. However, it is more conventional to print the translation in English with the first name first. This may make it desirable to change the output in order to deviate what was seen in the parallel training data.

Certain modern statistical machine translation systems have integrated a rule based translation component for things like numbers and dates. There have also been attempts to combine statistical translation with other full sentence machine translation systems by performing an independent translation with the different systems and deciding which of the systems provides a better translation.

SUMMARY

An aspect of the present system is to integrate non-statistical translation components, along with statistical components, to use certain components for certain kinds of translation. An aspect allows training to determine when it is desirable to use different components for different parts of the translation operation.

The techniques described herein use a parallel training corpus. The system may automatically learn from the corpuses where entity translation component or components are likely to produce or better translations. This system can automatically learn a confidence factor for different entity translation components in specific contexts. Therefore, this approach can also adapt to unreliable entity translation components.

BRIEF DESCRIPTION OF THE DRAWINGS

These and other aspects will now be described in detail with reference to the accompanying drawings, wherein.

DETAILED DESCRIPTION

The present system describes integration of non-statistical machine translation components into a statistical machine translation framework. This is done by using a processing device to determine automatically which parts of an input string should use a "baseline" machine translation system, and which parts should use another entity translation component or components, referred to herein as the translation component.

Figure 1:
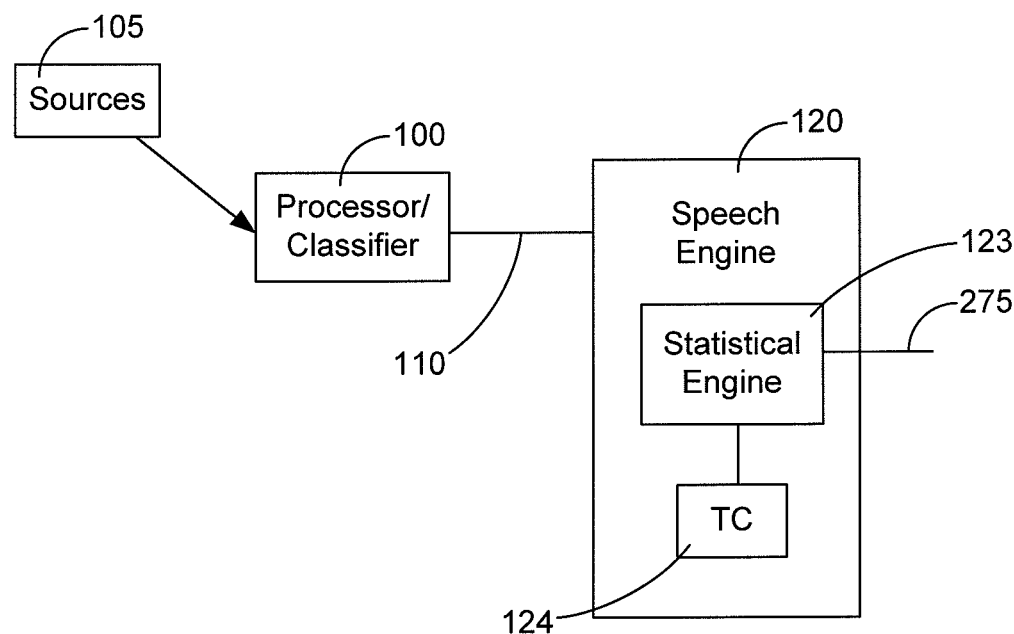
FIG. 1 shows a block diagram of the translation system.

FIG. 1 illustrates an exemplary hardware device which may execute the operation that is described with reference to the flowcharts of FIGS. 2 and 3. For the application of language translation, a processing module 100 receives data from various sources 105. The sources may be parallel corpora of multiple language information. Specifically, the sources may include translation memories, dictionaries, glossaries, Internet information, parallel corpora in multiple languages, non-parallel corpora in multiple languages having similar subject matter, and human-created translations. The processor 100 processes this information to produce translation parameters which are output as 110. The translation parameters are used by language engine 120 in making translations based on input language 130. In the disclosed embodiment, the language engine 120 includes a statistical engine 123, and at least one translation component 124. The language engine translates from a first language to a second language. However, alternatively, the speech engine can be any engine that operates on strings of words, such as a language recognition device, a speech recognition device, a machine paraphraser, natural language generator, modeler, or the like.

The processor 100 and speech engine 120 may be any general purpose computer, and can be effected by a microprocessor, a digital signal processor, or any other processing device that is capable of executing the operations described herein.

The flowcharts described herein can be instructions which are embodied on a machine-readable medium such as a disc or the like. Alternatively, the flowchart can be executed by dedicated hardware, or by any known or later discovered processing device.

The translation component 124 can be any existing translation component of any type, including a rule-based translator, or any other kind of machine translation component. Such translation components may be capable of translating many different kinds of information from one language to another.

In the embodiment, translation component 124 is used to translate only a portion of the information that it is capable of translating. For example, the translation component may be capable of translating standard two or three character Chinese names. This may apply to many different Chinese size strings. This may include, for example, certain strings which are not actually names. One aspect of the system is to identify the portions with are desired to be translated by the translation component. For example, in the above example, the component must determine how to identify the Chinese names in text, and then to translate those names using the component 124. Other Chinese language information is translated using the statistical engine 123.

Another aspect detects whether the translation component uses a complete and/or accurate rule set. For example, if the rule set for the translation component 124 for a specific translation is incomplete, then the engine 120 will consider using instead the baseline statistical machine translation part 123.

Using the above example, therefore, the goal is to identify Chinese names where the translation component 124 produces a correct translation. The translation component can therefore be used for entities that are not actually person names and can be translated; for example, company names that are constructed like person names.

Therefore, the training of the machine trains not only the statistical machine translation, but also trains when to use the statistical machine translation. The translator is given a source sentence in a source language, for example Chinese, which is to be translated into a target language, for example English. Among all possible target sentences, the machine may choose the sentence with the highest probability $$\hat{e} = \operatorname*{argmax}_{e} \{Pr(e \mid f)\} \qquad (1)$$

Where the symbol Pr(.) represents general probability distributions with no, or virtually no, assumptions, argmax, denotes the search for the output sentence in the target language, and e is the sentence.

The posterior probability is modeled using a log linear model. This framework produces a set of M feature functions $h_m(e,f)$, m-1 ... M.

Each feature function M also has a model parameter $\lambda_m$, where m=1 ... M.

The direct translation probability is given by:

$$Pr(e \mid f) = p_{\lambda_j^M}(e \mid f) \qquad (2)$$

$$= \frac{\exp\left[\sum_{m=1}^{M} \lambda_m h_m(e, f)\right]}{\sum_{e'} \exp\left[\sum_{m=1}^{M} \lambda_m h_m(e', f)\right]} \qquad (3)$$

information may be translated by developing feature functions that capture the relevant properties of the translation task. These basic feature functions may include the alignment template approach described in "Discriminative Training And Maximum Entropy Models For Statistical Machine Translation", Och and Ney 2002, proceedings of the 40th annual meeting of the Association for computational linguistics. This translation model segments the input sentence into phrases, translates these phrases, and reorders the translations into the target language.

Another possible feature function is a trigram language model. The feature functions may be trained using the unsmoothed maximum BLEU criterion, described in minimum error rate training in statistical machine translation (Och, 2003).

Training procedures for obtaining alignment templates is described in (Och 1999). Computation of word alignment in the parallel training corpus may use an expectation maximization technique, and a statistical alignment technique. See for example (Och and Ney 2003). This word alignment forms the basis for computing the probabilistic phrase to phrase translation lexicon p(e|f), which is used to store the translation of the phrase.

The translation component 124 is a machine translation system or module that can translate specific source language expressions into corresponding target language expressions. The translation component may provide the translation that is "best", or may alternatively combine a candidate list of translation possibilities.

Different environments may use different translations. For example, the translation components may include:

a Chinese name translation—this translation component is a simple rule-based translation component that operates for two and three character Chinese names. This is done by applying the Pinyin rules to Chinese characters that frequently occur as parts of names, to identify and translate those Chinese names.

Number translation—this translation component performs a rule-based translation of Chinese numbers, percentages, and time expressions. It operates by determining such numbers percentages and time expressions, and translating them using rules.

Date translation—this translation component translates the expressions. One example is Nov. 2, 1971. The translation component will automatically translate this to the proper language.

An important issue is integration of these components with the statistical translator and training of when to use which one.

An ideal translation component provides no wrong translations at all. It provides the set of all correct translations for a given substring. Real world translation components make errors, and provide incorrect translations. For example, the Chinese name entity translation component frequently generates wrong translations when applied to Korean names. Certain expressions cannot be easily translated by the component. For example the date translator may provide 27 days, or the 27th as potential translations of the same characters. Only one of the two is correct for a specific context. Proper integration of the statistical translator with a translation component, therefore, requires learning/training when to use each of the components, and also training of the proper format to output.

Figure 2:
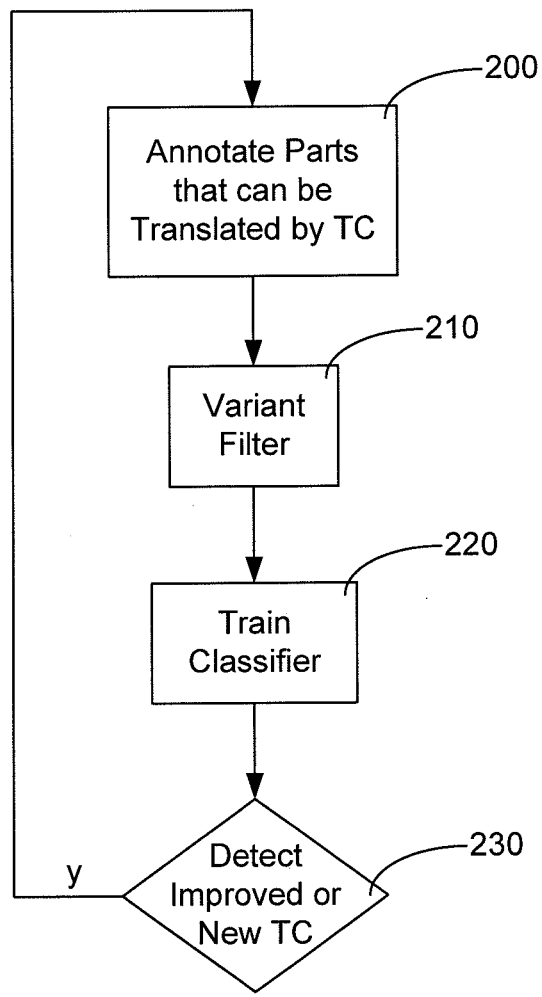
FIG. 2 shows a flowchart of training a classifier that determines when to use different components for different translations.

FIG. 2 shows a flowchart showing how to learn automatically from a set of translation components in a parallel corpus, and to determine automatically which of the statistical engine 123, or the translation component 124, should be used to translate the source language string.

At 200, a translation component is annotated to list each substring that is capable of being translated by a translation component. Note that there may be one or many different translation components. The annotated corpus indicates which words/portions in the corpus can be translated with any of those translation components. That is done by determining words in the source language, that have a translation, via a translation component, actually occurring in the corresponding target language segment.

In an implementation, this may be carried out by applying all the translation components to all the source language substrings of the training corpus. The target language corpus may be used to determine if the training components has produced a correct translation.

A variant filter at 210 is used to attempt to prevent different forms of the same word from being rejected. The translation component at 200 may classify a correct translation as being wrong if the parallel training corpus is used as a variant of what the training component has proposed. The variant filter may analyze all or many of the possible translations. For example, all of the following strings: a thousand, one thousand or 1000, refer to the same number. Any of these is the correct translation of the Chinese word for "thousand". The variant filter may allow any of these translations to be accepted.

It may be desirable to provide enough precision in the translation component to avoid negative instances as being misclassified as positive instances.

At 220, the annotated corpus is used for classifier training. A probabilistic classifier is trained based on the data. The classifier may be part of the processor 100. The classifier determines, for each source language sub string, and its source language context, if the translation component has actually produced a correct translation, or not a correct translation.

In operation, given a large parallel training corpus, a very large annotated corpus may be automatically generated. For language pairs like Chinese/English and Arabic/English, there may be readily available parallel corpora of more than 100 million words. Human-annotated training corpora are typically much smaller, e.g., they may be rarely less than larger than one million words.

Another aspect is that the automated annotation may be directly oriented toward the ultimate goal which is to use a certain translation component to produce correct translations. As a result, those instances for which the translation component produces a wrong translation may be annotated as negative instances.

When the translation component 124 is improved via increased coverage or improved quality of translation, an annotated corpus can be automatically regenerated at 230. The model may then be retrained to detect when to use the improved training corpus. Similarly, re-training can occur when the statistical database 123 is improved, when a new translation component is added, or when some other situation occurs.

This allows integration of different training components that each translate the same kind of instructions. The system learns automatically in this way when to trust which translation component. This allows automatic determination of which are acceptable and not acceptable translation components for particular words in particular contexts.

Mathematically speaking, to determine if the certain source language substrate of a source language string can be translated with the correct translation component to produce the translation, a model can be trained according to:

$$p(c|f_{j_1}^{j_2}, f_{j_1-2}^{j_1-1}, f_{j_2+1}^{j_2+2}, TC_n, e_1^1) \quad (4)$$

Where $f_j$ represent substrings of a source language string; $TC_n$ is a specific translation component, and c stands for the two situations where "the translation component produces the correct translation" or "the translation component does not produce the correct translation". A standard maximum entropy model described by Berger 96 may be used that uses each single dependent variable in equation 4 as a feature, is combined with the class c.

Different classifier models may be used for this framework, besides the maximum entropy classifier. A maximum entropy classifier may obtain probabilities which can be reasonably compared for different substrings.

Figure 3:
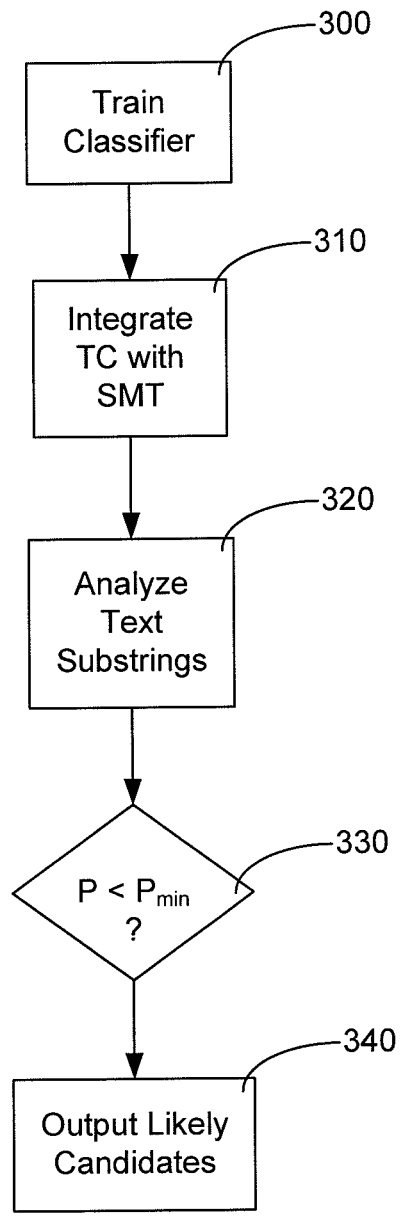
FIG. 3 shows a flowchart of operation using multiple translation components.

FIG. 3 shows the overall operation of using the engine. The classifier is trained at 300, using the flowchart of FIG. 2. Once the classifier is trained in this way, the translation component is integrated into the overall process of the phrase based statistical machine translation system at 310. Each sub string of the text to be translated is analyzed at 320. The operation computes the probability that the translation component will produce a correct translation. A filter at 330 uses a threshold $p_{min}$ to filter those cases where the probability of correct translation is too low. The resulting set of named entities is then used as an additional phrase translation candidates. These are hypothesized in search together with the phrases of the baseline statistical machine translation system at 340.

The statistical machine translation system balances between the use of translation component phrases and baseline system phrases. This may be defined by an additional feature function which counts the number of translation component phrases that are used. This may be stored as a variable referred to as TC-PENALTY. Other feature functions, such as a language model, or a reordering model, may also score those phrases.

Another aspect may enforce the use of translation component phrases if the corresponding source language sub string is rarely seen.

The translation component may also be integrated into the word alignment process between the parallel corpora. This may be done to improve word alignment accuracy during training. This procedure may automatically detect whether the translation component is trained sufficiently to be reliable. Once the translation components is sufficiently reliable, that information can be used to constrain the word alignment generated in the training procedure better alignment between the two languages may be obtained by using the translation components for certain phrases.

This training may use different statistical alignment models such as the IBM model 1, the HMM, and/or the IBM model 4. This constraint may also be integrated by constraining the set of considered alignments in the expectation maximization algorithm. This constraint may also improve the alignment quality of the surrounding words. For example, there may be a first order dependence among the alignment positions of the HMM and model for alignment models.

Some exemplary results are provided to explain the concepts. The results are based on a Chinese to English translation which was done in 2003. Table 1 provides statistics on the training, development and test corpus that was used. There are four reference translations, from the training corpus (train small, train large, dev and test.)

TABLE 1

Characteristics of training corpus (Train), development corpus (Dev), test corpus (Test).

| | | Chinese | English |
|---|---|---|---|
| Train (small) | Segments | | 5 109 |
| | Words | 89 121 | 111 251 |
| Train (large) | Segments | | 6.9M |
| | Words | 170 M | 157M |
| Dev | Segments | | 935 |
| | Words | 27 012 | 27.6 K-30.1 K |
| Test | Segments | | 878 |
| | Words | 24 540 | 25.3 K-28.6 K |

The system uses a subset of 128,000 sentences from the large parallel corpus to generate the translation component works-annotated corpus. Based on this corpus, 264,488 Chinese substrings can be translated using any of the rule based translation component, suggesting altogether approximately 364,000 translations. 60,589 of those translations, or 16.6%, also occur in the corresponding target language; called positive instances.

A review of these annotations shows that positive instances of the automatic corpus annotation are rarely incorrectly annotated, on the other hand, negative instances are much more frequent due to the existence of sentence alignment errors, and insufficient recall of the translation component.

For evaluation purposes, the test corpus was annotated in the same way as the training database. The test corpus is perfectly sentence aligned, and therefore there are no wrong negative instances due to alignment. In the test corpus, there are 2529 substrings that the translation component can translate, and when it does, it suggests 3651 translations of which 1287 (35.3%) also occur in any of the four references.

Using that annotated training corpus, the maximum entropy classifier described above is trained. Table 2 provides the results of this classifier for the development Corp. this for various training corpus sizes. This experiment uses $P_{min}=0.2$.

TABLE 2

Quality of classifier trained on the automatically annotated corpus

| # Segments | Errors[%] | Strict Precision [%] | Recall[%] | Loose Precision[%] |
|---|---|---|---|---|
| 1,000 | 18 | 79 | 65 | 88 |
| 2,000 | 17 | 85 | 63 | 90 |
| 4,000 | 16 | 86 | 67 | 91 |
| 8,000 | 14 | 88 | 70 | 92 |
| 16,000 | 13 | 89 | 71 | 94 |
| 32,000 | 11 | 92 | 75 | 95 |
| 64,000 | 9 | 94 | 78 | 97 |
| 128,000 | 8 | 95 | 80 | 97 |

(Errors[%]: error rate of classifier (percentage of suggested translations that are correct),
(Strict) Precision[%]/Recall[%]: precision and recall of classifier,
Loose Precision[%]: percentage of source language sub-strings where any of the suggested translations is correct).

In operation, a precision as high as 95% was eventually obtained with the recall of the person. See table 2 which shows the actual values. The column entitled "loose precision" provides a percentage of source language substrings where any of the suggested translations also occur in the references. Eventually the precision of 97% was achieved. This means that about 3% of the Chinese substrings for which a translation were not correct.

Word alignment that is computed by the statistical alignment models may be used to train the phrase based translation models, on those parts of the text where the automatic corpus annotation detects a translation. The automatic corpus annotation may be a very high precision, and can be used to improve the translation. One aspect, therefore, may improve general word alignment quality using the information in the translation component induced word alignment, in the statistical word alignment training.

Although only a few embodiments have been disclosed in detail above, other modifications are possible, and this disclosure is intended to cover all such modifications, and most particularly, any modification which might be predictable to a person having ordinary skill in the art. For example, the above has described integration of rule based translation components. It should be noted that other components, such as statistical components and the like may select alternative translations that can be used. The probability assigned by the model can be an additional feature for the classifier.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method comprising:
   executing instructions stored in memory via a processor of a language engine for:
   training the language engine to train for statistical machine translation;
   training the language engine when to use statistical machine translation by applying a machine learning method to a bilingual text that has been annotated with the output of a non-statistical translation component along with information identifying the type of the translation component;
   translating information from a first language to a second language using at least two translation components, wherein at least one translation component is a non-statistical translation component, each of the at least two translation components capable of translating equivalent phrases, each of the at least two translation components being selected based upon evaluation of an annotated training corpus, the annotated training corpus comprising substrings in the first language that have been annotated to associate the substrings with one or more translation components that are to be utilized to translate the substrings; and
   automatically selecting a preferred component from the at least two translation components, the preferred component providing a translation having a highest probability of being correct.

2. A method as in claim 1, further comprising defining a feature function that indicates when to use the at least two translation components.

3. A method as in claim 1, wherein automatically selecting the preferred component comprises:
   obtaining a phrase to be translated; and
   computing a probability of being correct in translating the phrase for each of the at least two translation components.

4. A method as in claim 3, further comprising:
   detecting variants of a translation of the phrase; and
   accepting the translation of the phrase as being proper if the translation of the phrase is equivalent to one of the variants.

5. A method as in claim 4, further comprising annotating a training corpus based on the variants to form an annotated training corpus.

6. A method as in claim 1, wherein a first component of the at least two translation components comprises a statistical translator and a second component of the at least two translation components comprises a nonstatistical translator for proper nouns.

7. A method as in claim 1, wherein a first component of the at least two translation components comprises a statistical translator and a second component of the at least two translation components comprises a nonstatistical translator for names.

8. A method as in claim 1, wherein a first component of the at least two translation components comprises a statistical translator and a second component of the at least two translation components comprises a nonstatistical translator for numbers.

9. A method as in claim 1, further comprising automatically re-selecting a second preferred component from the at least two translation components in response to an occurrence.

10. A method as in claim 9, wherein the occurrence comprises adding an additional nonstatistical translation component to the at least two translation components.

11. A method as in claim 9, wherein the occurrence comprises improving at least one of the at least two translation components.

12. A method as in claim 1, further comprising:
training a format of an output of a machine translation system based on a training corpus; and
allowing at least one of a plurality of different formats to be selected from within the training corpus.

13. A system comprising:
a memory for storing executable instructions;
a processor for executing the instructions for training a language engine to train for statistical machine translation and training the language engine when to use statistical machine translation by applying a machine learning method to a bilingual text that has been annotated with the output of a non-statistical translation component along with information identifying the type of the translation component;
at least two translating parts stored in memory and executable by the processor, wherein at least one translating part is a non-statistical translation part, each of the at least two translating parts operational to translate information from a first language to a second language and each of the at least two translating parts capable of translating equivalent phrases, each of the at least two translating parts being selected based upon evaluation of an annotated training corpus, the annotated training corpus comprising substrings in the first language that have been annotated to associate the substrings with one or more translating parts that are to be utilized to translate the substrings; and
a classifier part stored in memory and executable by the processor to automatically select a preferred component from the at least two translating parts, the preferred component providing a translation having a highest probability of being correct.

14. A system as in claim 13, further comprising a training corpus.

15. A system as in claim 14, further comprising an output module that formats an output based on the training corpus.

16. A system as in claim 13, further comprising a variant detector that detects variants of a translated phrase and accepts the translated phrase as being proper if the translation phrase is one of the variants.

17. A system as in claim 16, further comprising an annotated training corpus based, at least in part, on the variants.

18. A system as in claim 13, wherein a first part of the at least two translating parts comprises a statistical translator component and a second part of the at least two translating parts comprises a nonstatistical translator component for proper nouns.

19. A system as in claim 13, wherein a first part of the at least two translating parts comprises a statistical translator component and a second part of the at least two translating parts comprises a nonstatistical translator component for names.

20. A system as in claim 13, wherein a first part of the at least two translating parts comprises a statistical translator component and a second part of the at least two translating parts comprises a nonstatistical translator component for numbers.

21. A system as in claim 13, further comprising a feature part that indicates when to use the at least two translation components.

22. A system as in claim 13, wherein the classifier part comprises a probabilistic classifier.

23. A system as in claim 13, further comprising at least one additional translating part.

24. A non-transitory computer readable storage medium having embodied thereon a program, the program executable by a processor to perform a method, the method comprising:
training a language engine to train for statistical machine translation; training the language engine when to use statistical machine translation by applying a machine learning method to a bilingual text that has been annotated with the output of a non-statistical translation component along with information identifying the type of the translation component;
translating information from a first language to a second language using at least two translation components, wherein at least one translation component is a non-statistical translation component, each of the at least two translation components capable of translating equivalent phrases, each of the at least two translation components being selected based upon evaluation of an annotated training corpus, the annotated training corpus comprising substrings in the first language that have been annotated to associate the substrings with one or more translation components that are to be utilized to translate the substrings; and
automatically selecting a preferred component from the at least two translation components, the preferred component providing a translation having a highest probability of being correct.

25. The method as in claim 1, further comprising utilizing a statistical machine translator if the at least two translation components are using a rule set that is inaccurate.

26. The method as in claim 1, further comprising generating an annotated training corpus by:
applying a plurality of translation components to substrings in a first language to translate the substrings into a second language; and
annotating strings in a first language for each translation component that accurately translates the substring into a second language.

27. The method as in claim 26, further comprising evaluating context of a translation of a substring by evaluating the translated substring relative to a string from which the substring was obtained.

28. The method as in claim 27, further comprising determining an accurate translation by ensuring that the translation is both correctly translated and contextually correct.

29. The method as in claim 26, further comprising automatically regenerating the annotated training corpus when a quality of translations generated by at least one of the two translation components has increased.

30. The method as in claim 1, selecting the at least two translation components by applying a maximum entropy model to each substring that is to be translated by the at least two translation components.

* * * * *